3,546,710
CARDIAC VALVE PROSTHESIS FOR
SUTURELESS FIXATION
Valery Ivanovich Shumakov, Otkrytoe Shosse 1, korp 11, kv. 47; Evgeny Alexandrovich Ivanov, Krasnokholmskaya nab. 13/15, kv. 339; Boris Nikolaevich Patsev, 5 Parkovaya 54, korp. 3, kv. 27; Matvei Mikhailovich Mats, 5 ul. Sokolinoi gory 18-a, kv. 74; Alexi Alexandrovich Konoplev, Shosse Entuziaston 184-a, kv. 47; and Boris Pavlovich Vavilov, pl. Ilicha 1/2, kv. 123, all of Moscow, U.S.S.R.
Filed Dec. 12, 1966, Ser. No. 600,811
Claims priority, application U.S.S.R., Dec. 11, 1965, 1,041,807
Int. Cl. A61b 17/00; A61f 1/22
U.S. Cl. 3—1                                       2 Claims

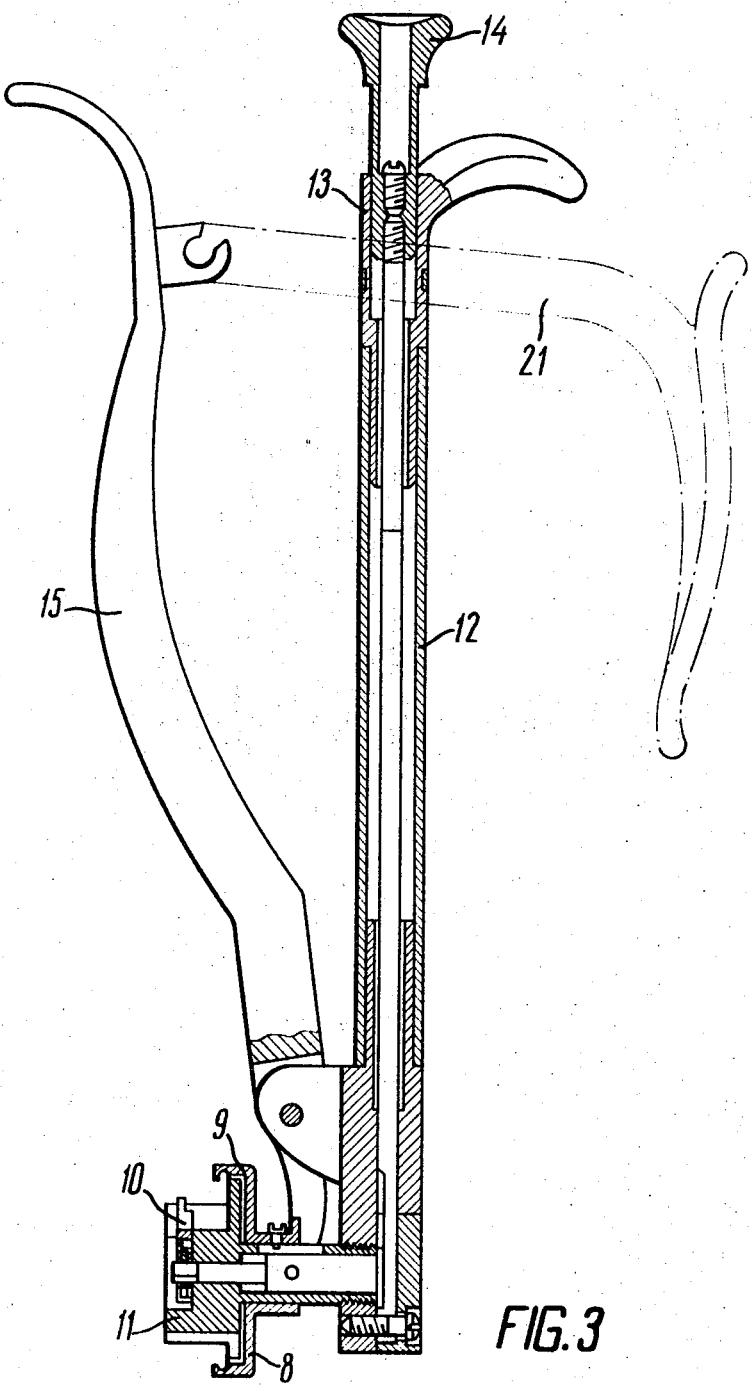

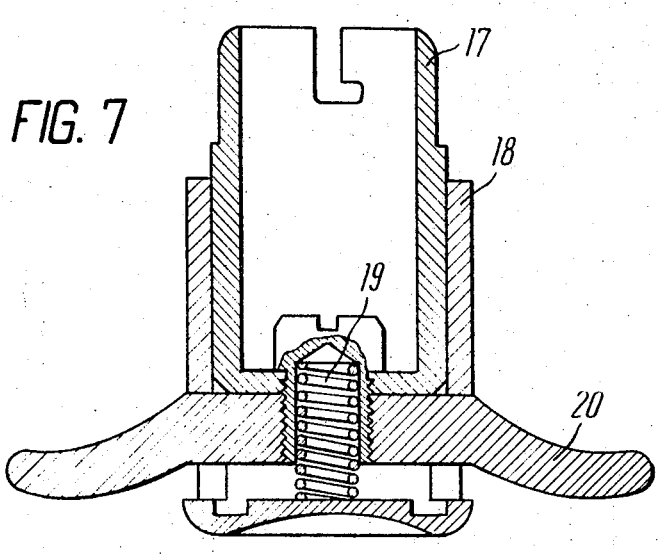
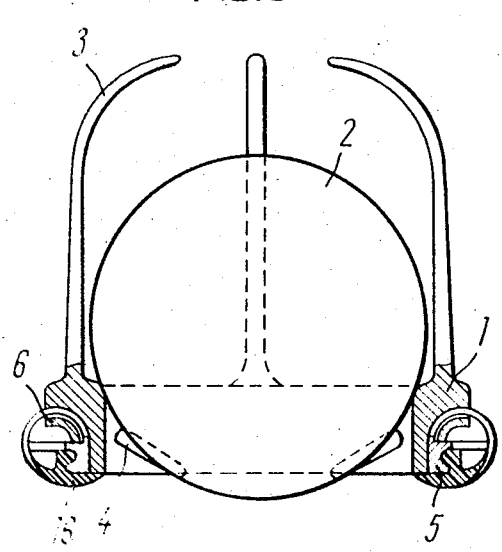
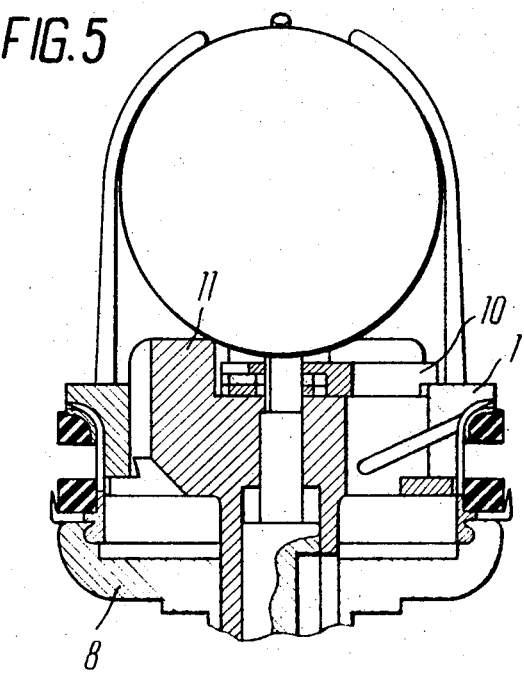

ABSTRACT OF THE DISCLOSURE

A cardiac valve prosthesis in which a needle rim has needles which engage in curved channels in a valve seat when the rim is displaced towards the seat to emerge in curved form therefrom and cooperate with other needles on the rim to secure the prosthesis to myocardiac tissues. An instrument for mounting the prosthesis comprises a detent washer which has claws for engaging in recesses in the rim of the prosthesis and fingers which engage the seat on the prosthesis, the detent washer being supported in a displaceable holder which operates to displace the rim of the prosthesis when the claws are engaged in the recesses and the fingers engage the seat.

---

This invention relates to the art of application of cardiac valve prostheses with sutureless fixation to the myocardiac tissues.

Known in the art are cardiac valve prostheses with sutureless fixation to the myocardiac tissues by means of a needle rim whose needles are free to fit into curved channels made in the seat of the valve prosthesis thereby fixing it in position (cf. U.S.S.R. author's certificates Nos. 180,749 and 180,750).

An object of the invention is to improve both said valve prosthesis and said instrument for fixing it in position.

A further object of the present invention is to provide a cardiac valve prosthesis and an instrument for mounting and fixing it in position which enable better conditions for performing surgical operation, as well as reduce the time to be spent therefor.

According to the invention, recesses are made around the perimeter of said needle rim on the outer side thereof, whereas a detent washer of said instrument is provided with projections or claws which correspond to the above said recesses and constitute a bayonet lock while interacting therewith for coupling the prosthesis to the instrument in the course of fixing the prosthesis to the tissues of the myocardium, said washer with projections or claws being capable of endlong motion on a holder which mounts radially-collapsible fingers interacting with the seat of the prosthesis and controllable by the instrument handle through a link or rod, whereas the aforesaid endlong motion of said washer about said holder for fixing the prosthesis in position is controlled from a lever mounted on the same handle.

Apart from this, an annular-shaped cover plate is advantageously fitted onto the outer side of the needle rim for the purpose of covering the recessed (outer) end face thereof since the recesses (or irregularities) are likely to cause thrombogenesis after the prosthesis has been fixed in position.

For placing the said annular cover plate onto the needle rim of a valve prosthesis, use can be made of an instrument having a hollow inner cylinder with L-shaped slots to engage stops of the prosthesis whereby the cylinder is fixed in place when the above-mentioned annular-shaped cover plate is deployed from a circular groove provided on the cylinder outer surface and fitted onto the recesses of the needle rim which is effected with the aid of an axially movable sleeve accommodating said cylinder and coupled thereto through a handle and a spring. Other objects and advantages of the invention will become apparent from the following description and the accompanying drawings, wherein:

FIG. 3 illustrates, partly in section, the instrument for mounting and fixing the prosthesis in position, according to the invention;

FIG. 5 illustrates, in side sectional view, the aforesaid washer while catching the needle rim of the prosthesis;

FIG. 6 illustrates, in section, the prosthesis having been fastened together with the annular-shaped cover plate; and FIG. 7 illustrates, in section, the instrument for placing said annular-shaped cover plate.

Figure 1:
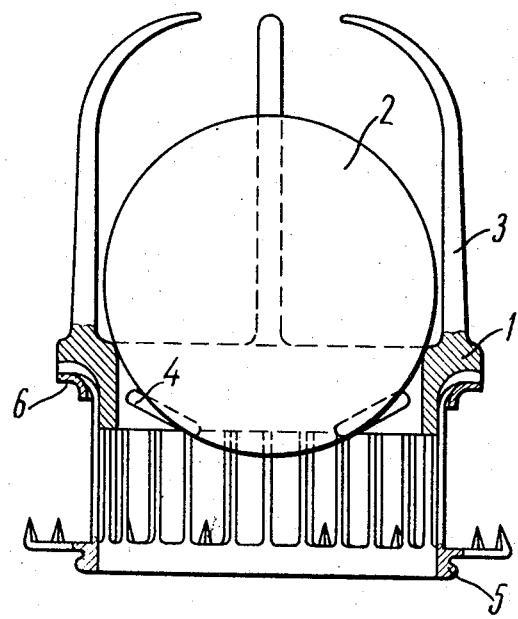
FIG. 1 illustrates, partly in section, the prosthesis of the present invention prior to mounting.

Referring to the drawing, the cardiac valve prosthesis comprises a valve seat 1 (FIG. 1), a ball 2, three stands 3 which limit the ball travel, three stops 4 preventing said ball 2 from jamming in the seat 1 and a double needle rim 5.

The seat 1 of the prosthesis is provided with curved channels 6, through which the longer needles of the rim 5 pass.

Figure 2:
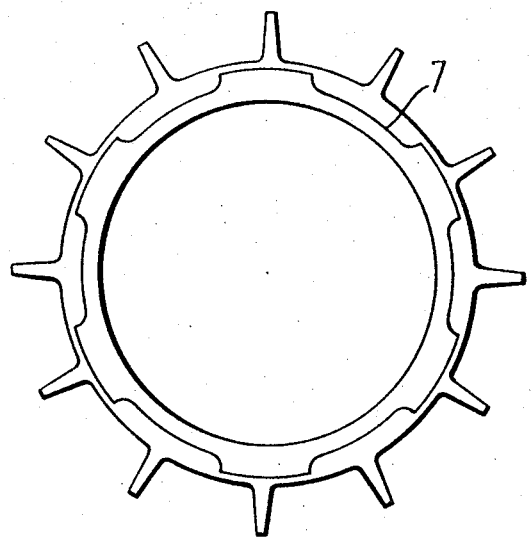
FIG. 2 illustrates the needle rim provided with recesses made around its perimeter on the outer side thereof, according to the invention.

The rim 5 is provided with recesses 7 (FIG. 2) for joining with the instrument for mounting and fixing the prosthesis in position.

Figure 4:
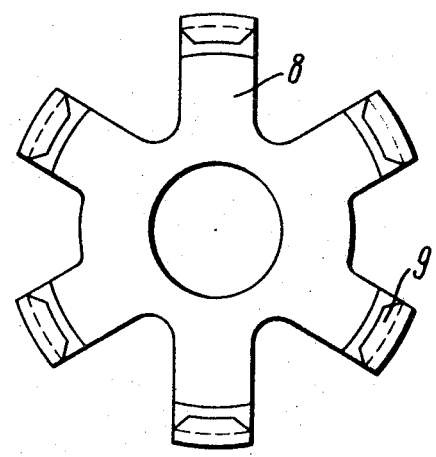
FIG. 4 illustrates the detent washer of the instrument provided with projections or claws, according to the invention.

The instrument comprises a detent washer 8 (FIG. 4) provided with projections or claws 9 making up a bayonet lock for coupling the instrument to the prosthesis; fingers 10 (FIG. 3) movable in radial direction; a cylindrical holder 11 onto which the seat 1 of the prosthesis is free to fit; a fixed handle 12 provided with a link or rod 13 and a button 14; and a lever 15. The instrument components involved in fixing the prosthesis in position and those controlling its functioning are arrange at right angles with each other.

The seat 1 of the prosthesis is fitted onto the cylindrical holder 11 when the button 14 is depressed and contacts the fixed handle 12. This being the case, the projections or claws of the washer 8 engage the recesses in the rim 5, whereas the fingers 10 do not project beyond the holder 11 surface. The prosthesis having been fitted onto the holder, the button 14 is pulled upwards.

As a result, the fingers 10 move outwards and the washer 8 turns so that its projections or claws 9 become engaged in the recesses 7 to form a bayonet lock.

Then the prosthesis fitted onto the instrument is so introduced into the heart that the seat 1 of the prosthesis is located inside the ventricle, and the rim 5 inside the atrium of the heart.

Thereupon the lever 15 is forced against the handle 12, whereby the rim 5 is made to move towards the seat 1; and the longer needles of the rim pass through the curved channels 6 and come out therefrom in curved form with a radius corresponding to that of said channels. At the same time, the shorter needles of the rim 5 perform a rectilinear movement to meet the longer ones. Thus, the prosthesis becomes fixed to the myocardiac tissues by means of two rows of needles both on the side of the ventricle and on that of the antrium of the heart.

Once the prosthesis fixation has been effected, the button 14 is pushed towards the handle 12, thereby causing the washer 8 to turn and the finger 10 to be retracted into the cylindrical holder 11 whereupon the instrument is removed.

For the purpose of isolating the area where the prosthesis is fixed to the myocardium, as well as the irregularities made up by the recesses of the rim 5, from the blood flow, an elastic annular-shaped cover plate 16 (FIG. 6) is provided which is to be placed upon the double needle rim after the prosthesis fixing procedure has been effected. The said cover plate is made of Teflon and has shoulder for joining with the recesses 7 of the rim 5. The cover plate is rigidly fastened onto the prosthesis through the use of an instrument composed of an inner cylinder 17 (FIG. 7) and a sleeve 18 interconnected by a spring 19 and a handle 20. The cylinder 17 is provided with L-shaped slots for coupling with the stops 4 of the prosthesis, as well as with a circular groove to accommodate the annular-shaped cover plate 16. When brought together with the handle 20, the bottom of the sleeve 18 makes the shoulder of the cover plate 16 engage the recesses of the rim 5, whereafter the instrument is removed. In case the prosthesis is found to have been fixed inadequately, it can be dismounted and removed.

To this end the prosthesis is to be made fast again on the instrument for its fixing, whereupon the handle 12 and the lever 15 are to be moved apart by means of an auxiliary handle 21. The prosthesis so extracted is suitable for subsequent use.

All the component parts of the proposed prosthesis are manufactured from biologically inert materials such as titanium alloys, silicon rubber, Teflon-4 and polyurethane foams.

What is claimed is:

1. A cardiac valve prosthesis for sutureless fixation to the myocardiac tissues, comprising: a valve seat defining an axial blood passage therethrough with curved channels extending generally axially therein, said seat including an upwardly extending cage structure retaining a movable valve member therein for cooperation with said seat to periodically open and close said blood passage in response to blood flow; a needle rim axially displaceable with respect to said seat and including a first set of needles positioned into said curved channels in said valve seat to emerge in curved form therefrom and cooperate with a second set of needles on said rim spaced from said first set of needles to fix said seat in position on the myocardiac tissues; a plurality of spaced recesses being provided in the perimeter of said needle rim on the outer side thereof for coupling the rim to an instrument for mounting and fixing said prosthesis in position to the myocardiac tissues.

2. A prosthesis as claimed in claim 1 including an annular-shaped cover plate having an axial passage therethrough and a plurality of spaced shoulders interconnected with said spaced recesses on said needle rim whereby said recesses are covered to avoid possible thrombogenesis within the area of the prosthesis fixation.

References Cited

UNITED STATES PATENTS

| 3,143,742 | 8/1964 | Cromie | 3—1 |
| 3,263,239 | 8/1966 | Edwards et al. | 3—1 |
| 3,371,352 | 3/1968 | Siposs et al. | 3—1 |
| 3,409,013 | 11/1968 | Berry | 128—303 |

FOREIGN PATENTS

| 180,750 | 9/1966 | U.S.S.R. | 3—1(HV)UX |

OTHER REFERENCES

1. "Sutureless Prosthetic Heart Valves" by G. J. Magovern et al. The Journal of Thoracic & Cardiovascular Surgery, vol. 46, No. 6, December 1963, pp. 726–736.

2. "Sutureless Aortic & Mitral Prosthetic Valves" by G. J. Magovern et al., The Journal of Thoracic & Cardiovascular Surgery, vol. 48, No. 3, September 1964, pp. 346–361.

3. "A Suture Holder and Separator Attachment to the Starr-Edwards Prosthetic Valve Holders" by J. T. Grismer, Surgery, Gynercology & Obstetrics, March 1965, pp. 583–584.

RICHARD A. GAUDET, Primary Examiner

R. L. FRINKS, Assistant Examiner

U.S. Cl. X.R.

128—303